(12) United States Patent
Nakama

(10) Patent No.: US 9,041,346 B2
(45) Date of Patent: May 26, 2015

(54) CHARGING APPARATUS AND METHOD FOR CONTROLLING CHARGING APPARATUS

(75) Inventor: Satoshi Nakama, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 417 days.

(21) Appl. No.: 13/256,056

(22) PCT Filed: May 13, 2010

(86) PCT No.: PCT/JP2010/058486
§ 371 (c)(1),
(2), (4) Date: Sep. 12, 2011

(87) PCT Pub. No.: WO2010/131776
PCT Pub. Date: Nov. 18, 2010

(65) Prior Publication Data
US 2012/0043932 A1 Feb. 23, 2012

(30) Foreign Application Priority Data

May 14, 2009 (JP) ................... 2009-118036

(51) Int. Cl.
H01F 38/14 (2006.01)
H02J 7/00 (2006.01)
H02J 7/02 (2006.01)
H04M 1/725 (2006.01)

(52) U.S. Cl.
CPC ............. *H02J 7/025* (2013.01); *Y02B 40/90* (2013.01); *H04M 1/7253* (2013.01); *H02J 7/0004* (2013.01)

(58) Field of Classification Search
USPC .......................................... 320/108
See application file for complete search history.

(56) References Cited

U.S. PATENT DOCUMENTS

| 6,271,764 | B1 * | 8/2001 | Okamura ................. 340/7.2 |
| 6,898,445 | B2 * | 5/2005 | Slettengren et al. ......... 455/567 |
| 7,301,528 | B2 * | 11/2007 | Marvit et al. ............... 345/156 |
| 7,469,155 | B2 * | 12/2008 | Chu ........................ 455/567 |
| 2007/0182367 | A1 * | 8/2007 | Partovi ..................... 320/108 |
| 2011/0095623 | A1 * | 4/2011 | Doh et al. .................. 307/119 |
| 2013/0257357 | A1 * | 10/2013 | Morinaga ................... 320/107 |

FOREIGN PATENT DOCUMENTS

| JP | 2001-197674 A | 7/2001 |
| JP | 2007-089341 A | 4/2007 |
| JP | 2009-072050 A | 4/2009 |

* cited by examiner

*Primary Examiner* — Edward Tso
*Assistant Examiner* — Jerry D Robbins
(74) *Attorney, Agent, or Firm* — Cowan, Liebowitz & Latman, P.C.

(57) ABSTRACT

A charging apparatus including a charging unit adapted to charge, in a non-contact manner, an apparatus to be charged placed in a charging region, a detector adapted to detect a charged state of the apparatus to be charged placed in the charging region, and a controller adapted to change a mode of the apparatus to be charged to a mode that inhibits vibration, according to the charged state detected by the detector.

44 Claims, 10 Drawing Sheets

F I G. 6
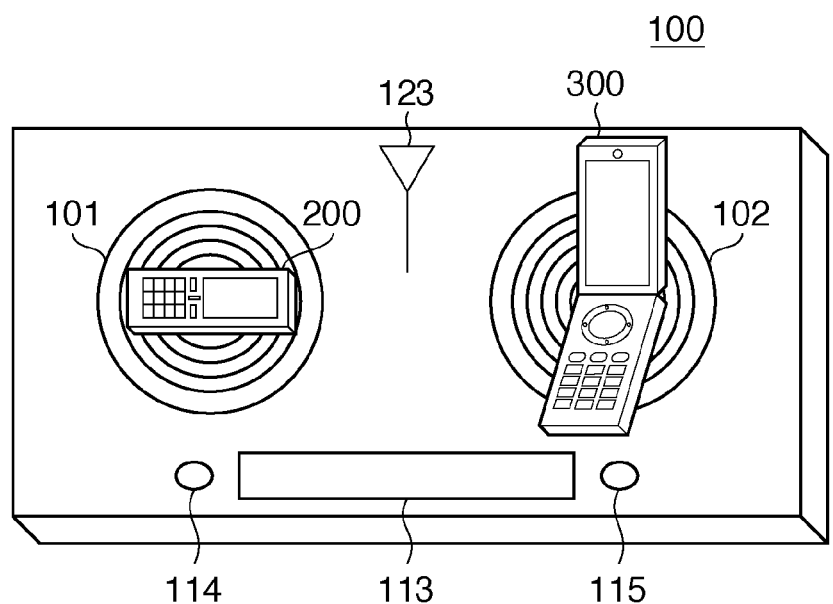

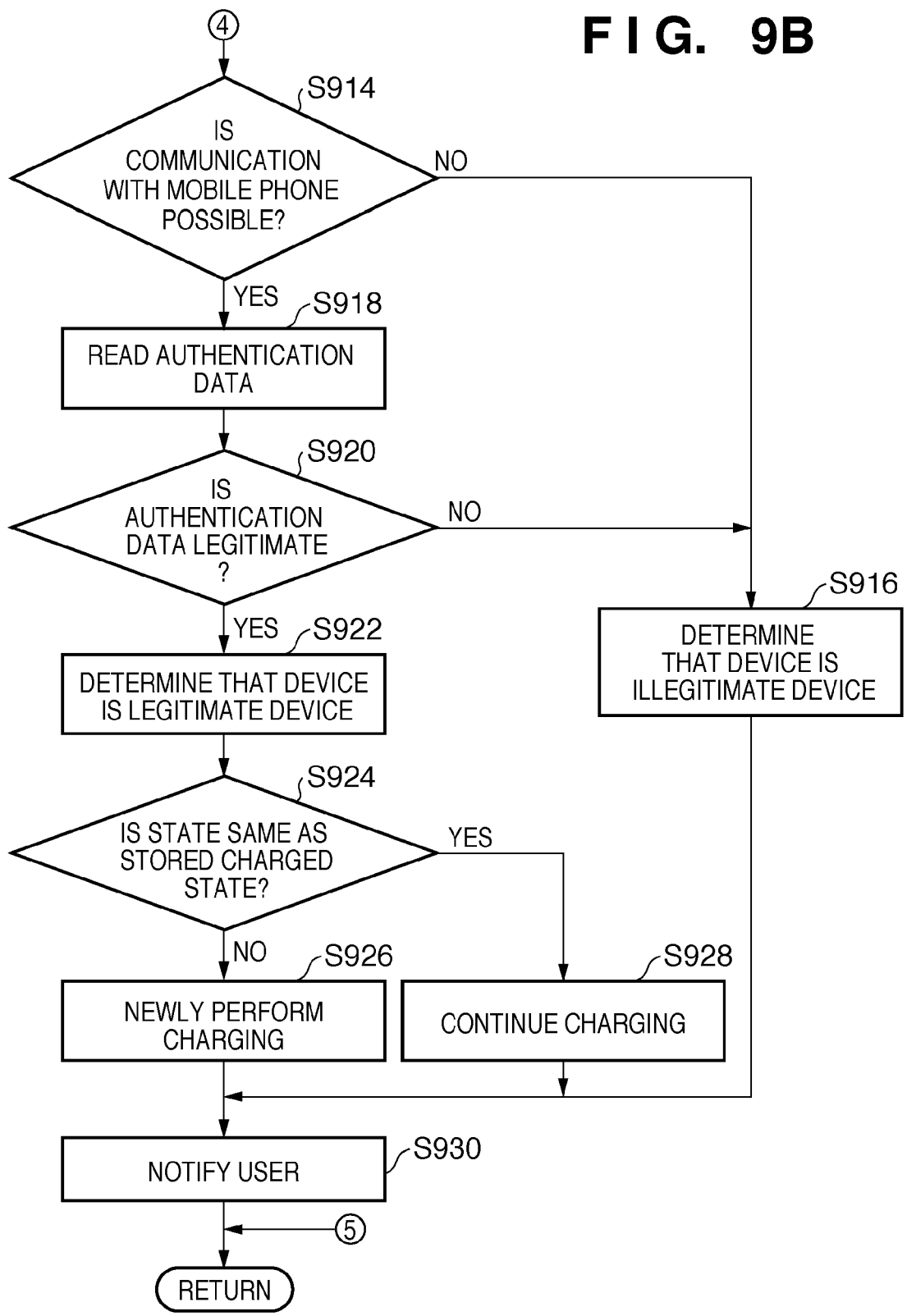

CHARGING APPARATUS AND METHOD FOR CONTROLLING CHARGING APPARATUS

CROSS-REFERENCE TO RELATED APPLICATIONS

This application is a national stage application of International Application No. PCT/JP2010/058486, filed May 13, 2010, whose benefit is claimed and which claims the benefit of Japanese Patent Application No. 2009-118036, filed May 14, 2009, the entire disclosures of which are incorporated herein by reference.

TECHNICAL FIELD

The present invention relates to a charging apparatus and a method for controlling a charging apparatus.

BACKGROUND ART

With the digitization of electrical devices, various charging techniques and techniques for supplying power to these electrical devices have been proposed, and, in recent years, techniques have been attracting attention for non-contact charging using electromagnetic induction wherein when a current flows through a primary coil on one side, an electromotive force is generated in a secondary coil on the other side. In non-contact charging, the positional relationship between a shaft of the primary coil on the side of a charger and a shaft of the secondary coil on the side of a device to be charged affects electrical efficiency, and the electrical efficiency may be extremely low depending on the position or the orientation of the shafts of the coils.

For example, in the case of electric toothbrushes, non-contact charging is applied using electromagnetic induction. A non-contact charger for an electric toothbrush typically has a socket into which the electric toothbrush is to be placed such that the positions of (the shafts of) the coils are not significantly displaced from each other (i.e., such that electrical efficiency is improved), and partially holds the electric toothbrush while charging.

Furthermore, non-contact charging is also applied in the case of mobile phones, and a non-contact charger of a mobile phone also has a structure (a groove, etc.) that does not allow the mobile phone to move significantly. Here, a mobile phone has a vibration function, and, under particular settings such as silent mode (vibration mode), a user is notified of an incoming call by vibration instead of generation of a sound or light; thus, when there is an incoming call while charging, the mobile phone may move out of the charger due to the vibration. Thus, a technique is proposed whereby the vibration mode is forcibly cancelled during charging of a mobile phone, and the mode is returned to the vibration mode after charging of the mobile phone ends (Japanese Patent Laid-Open No. 2001-197674).

However, this conventional technology assumes only a situation in which one non-contact charger charges one device to be charged, and does not consider a situation wherein one charger simultaneously charges a plurality of devices to be charged. For example, in a case where a plurality of mobile phones are simultaneously charged, even when the vibration mode of one mobile phone is forcibly cancelled, if another mobile phone is in vibration mode, the entire charger may vibrate due to the vibration of given mobile phone. As a result, the positional relationship between the charger (primary coil) and each of the plurality of mobile phones (secondary coils) may be displaced, and, thus, efficient charging cannot be performed (i.e., the optimal positional relationship is lost, and charging efficiency is decreased).

SUMMARY OF INVENTION

The present invention provides a technique that enables charging to be efficiently performed in a case where at least one device is charged in a non-contact manner.

According to an aspect of the present invention, there is provided a charging apparatus comprising a charging unit adapted to charge, in a non-contact manner, an apparatus to be charged placed in a charging region, a detector adapted to detect a charged state of the apparatus to be charged placed in the charging region, and a controller adapted to change a mode of the apparatus to be charged to a mode that inhibits vibration, according to the charged state detected by the detector.

According to another aspect of the present invention, it is possible to provide a technique that enables charging to be efficiently performed in a case where at least one device is charged in a non-contact manner.

Further features of the present invention will become apparent from the following description of exemplary embodiments with reference to the attached drawings.

BRIEF DESCRIPTION OF DRAWINGS

FIG. 6 is a schematic view showing an example of the charger shown in FIG. 1 and two devices to be charged (mobile phones).

FIGS. 9A and 9B are flowcharts for illustrating an example of a charging process on a mobile phone (device to be charged) using the charger shown in FIG. 8.

DESCRIPTION OF EMBODIMENTS

First Embodiment

Figure 1:
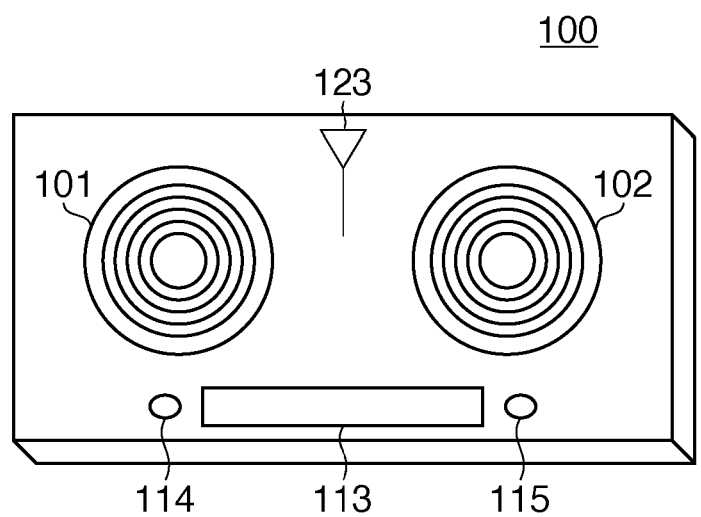
FIG. 1 is a schematic view showing an external view of a charger as an aspect of the present invention.

FIG. 1 is a schematic view showing an external view of a charger 100 as an aspect of the present invention. The charger 100 is a non-contact charger that can charge a plurality of devices in a non-contact manner using electromagnetic induction. In this embodiment, the charger 100 includes two coils (primary coils) 101 and 102 that charge, in a non-contact manner, devices placed in corresponding charging regions.

Furthermore, the charger 100 has an authentication function that determines whether or not a device to be charged that is placed in a charging region is a legitimate device (i.e., performs an authentication process for the given device), and can communicate with the given device via an antenna 123. The antenna 123 may be in any form as long as communication with the device is possible. Here, in this embodiment, the antenna 123 is exposed outside the charger 100 as shown in FIG. 1, but it may also be contained within the charger 100.

Furthermore, the charger 100 includes an LCD panel 113 for notifying a user of a charging error, a change in a charged state, charging completion, or the like (i.e., for displaying a message), and LEDs 114 and 115 respectively corresponding to the coils 101 and 102. The LED 114 and the LED 115 flash to notify a user of information relating to devices to be charged that are placed on the coils 101 and 102.

As is described later, the charger 100 includes a plurality of magnetic sensors such as Hall elements, and a plurality of temperature sensors such as thermistors. Here, it is assumed that each of the sensors is not exposed outside the charger 100. Here, the charger 100 is not provided with an internal battery, and has a power supply from a commercial power source via an AC adapter or the like.

Figure 2:
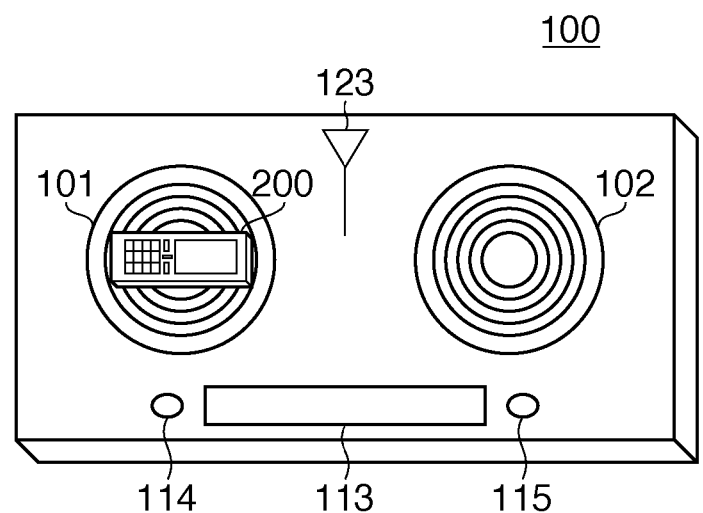
FIG. 2 is a schematic view showing an example of the charger shown in FIG. 1 and a device to be charged (mobile phone).

FIG. 2 is a schematic view showing an example of the charger 100 and a mobile phone 200, which is a device to be charged. Referring to FIG. 2, the mobile phone 200 as a device to be charged is placed in a charging region of the charger 100; more specifically, it is placed on the coil 101. The mobile phone 200 is provided with a rechargeable battery, and supports non-contact charging using electromagnetic induction by the charger 100. The charger 100 communicates with the mobile phone 200 placed on the coil 101 via the antenna 123, and performs an authentication process on the mobile phone 200. In the case where it is determined that the mobile phone 200 is a legitimate device (i.e., the mobile phone 200 is authenticated), the charger 100 causes a current to flow through the coil 101, thereby generating a magnetic flux. Accordingly, a voltage is generated on a coil (secondary coil) on the side of the mobile phone 200, and the rechargeable battery included in the mobile phone 200 is charged.

Figure 3:
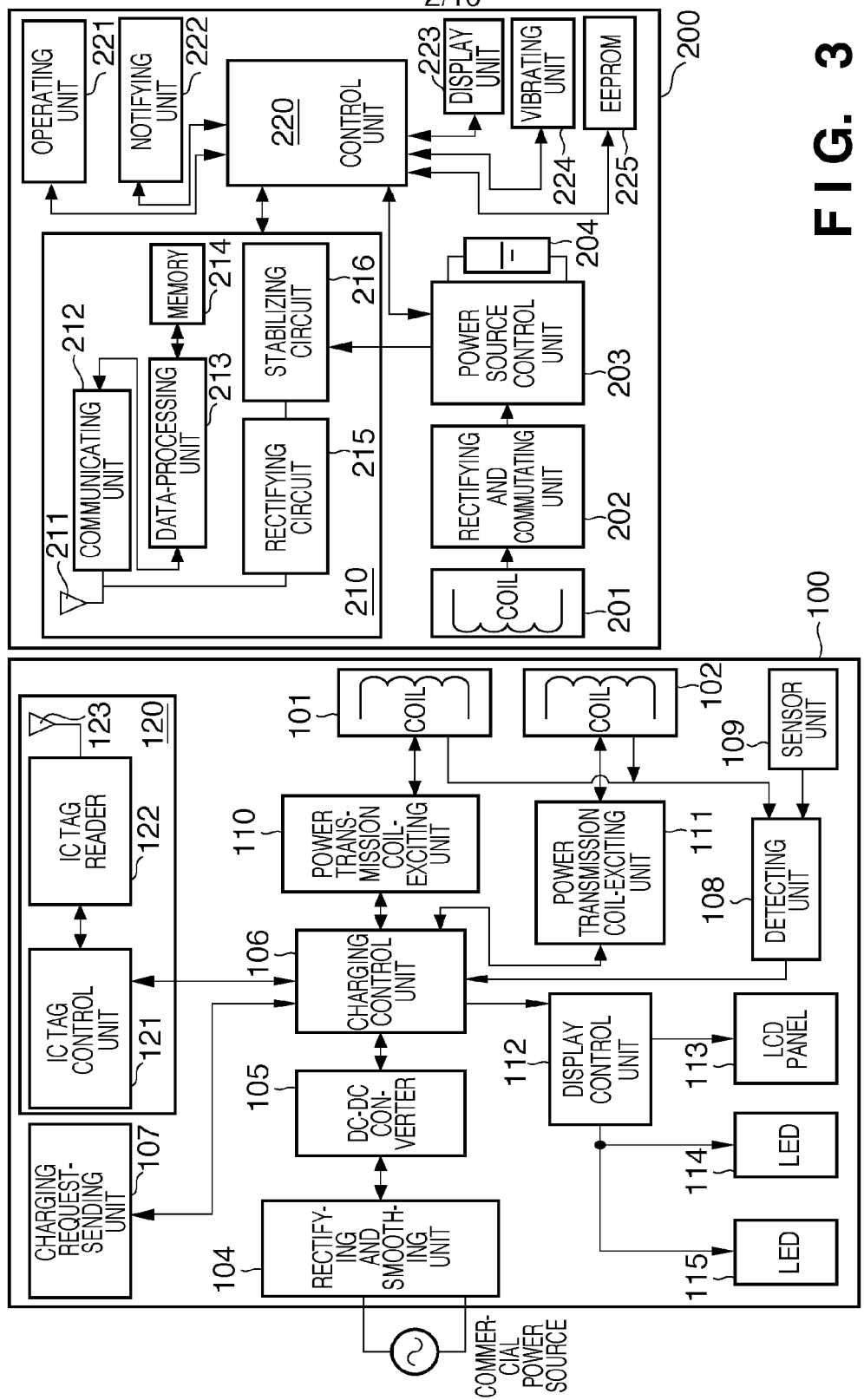
FIG. 3 is a circuit block diagram of an example of the charger and the mobile phone shown in FIG. 2.

FIG. 3 is a circuit block diagram of an example of the charger 100 and the mobile phone 200. As shown in FIG. 3, the charger 100 includes the coils 101 and 102, a rectifying and smoothing unit 104, a DC-DC converter 105, a charging control unit 106, and a charging request-sending unit 107. Furthermore, the charger 100 includes a detecting unit 108, a sensor unit 109, power transmission coil-exciting units 110 and 111, a display control unit 112, the LCD panel 113, the LEDs 114 and 115, and an IC tag authentication unit 120. Here, the IC tag authentication unit 120 includes an IC tag control unit 121, an IC tag reader 122, and the antenna 123.

The rectifying and commutating unit 104 rectifies and smooths an alternating voltage from a commercial power source input via an AC adapter or the like, and supplies the direct voltage to the DC-DC converter 105. The DC-DC converter 105 converts the direct voltage from the rectifying and smoothing unit 104 into a predetermined voltage, and supplies this voltage to the charging control unit 106.

The charging control unit 106 includes a CPU and a memory, and controls whether or not to output the direct voltage from the DC-DC converter 105, to the power transmission coil-exciting units 110 and/or 111. When outputting the direct voltage, the charging control unit 106 turns on a switch for controlling the power transmission coil-exciting unit 110 or 111, thereby outputting the direct voltage.

The power transmission coil-exciting units 110 and 111 excite the coils 101 and 102 using the direct voltage supplied from the DC-DC converter 105 via the charging control unit 106, thereby generating a magnetic flux.

The charging request-sending unit 107 sends a charging request to the charging control unit 106 at a set timer interval (for example, 2 seconds) based on timer information set by the charging control unit 106. In response to the instruction from the charging request-sending unit 107, the charging control unit 106 outputs a direct voltage to the power transmission coil-exciting units 110 and/or 111 at a set timer interval.

The detecting unit 108 detects a power transmission coil voltage and a power transmission coil current of the coil 101 and the coil 102. Furthermore, the detecting unit 108 obtains sensor information (results of the detection performed by the sensor unit 109) from the sensor unit 109, and transmits this information to the charging control unit 106. The sensor unit 109 is configured by arranging magnetic sensors for detecting the intensity of a magnetic field, as appropriate at respective parts of the charger 100, and detects the intensity of a magnetic field of the respective parts, thereby detecting the number and the position of devices to be charged placed in charging regions of the charger 100. Furthermore, the sensor unit 109 is also configured by arranging temperature sensors as appropriate at respective parts of the charger 100, and monitors a temperature of the respective parts, thereby preventing the temperature from abnormally increasing or the like, and ensuring the temperature of the charger 100.

Depending upon the information input from the charging control unit 106, the display control unit 112, for example, may output a message or an image to the LCD panel 113, or may cause the LED 114 or the LED 115 to flash.

The IC tag authentication unit 120 determines whether or not the mobile phone 200 is a legitimate device, by performing a predetermined communication with a non-contact IC tag 210 of the mobile phone 200. The IC tag control unit 121 obtains authentication data from the non-contact IC tag 210, and performs control to perform an authentication process on the mobile phone 200. The IC tag reader 122 operates under the control of the IC tag control unit 121, and reads the authentication data from the non-contact IC tag 210. The antenna 123 is an antenna that is connected to the IC tag reader 122, and that is used for communicating with the non-contact IC tag 210 of the mobile phone 200. Here, any non-contact IC tag techniques that are well known in the art may be applied to the authentication function in the IC tag authentication unit 120. Furthermore, the antenna 123 can receive not only authentication data but also setting information or the like relating to device settings of a device to be charged.

Meanwhile, the mobile phone 200 includes a coil 201, a rectifying and commutating unit 202, a power source control unit 203, a rechargeable battery 204, and the non-contact IC tag 210. Furthermore, the mobile phone 200 includes a control unit 220, an operating unit 221, a notifying unit 222, a display unit 223, a vibrating unit 224, and a non-volatile memory (EEPROM) 225. Here, the non-contact IC tag 210 includes an antenna 211, a communicating unit 212, a data-processing unit 213, a memory 214, a rectifying circuit 215, and a stabilizing circuit 216.

In the coil 201, a magnetic flux generated by the coil 101 or 102 of the charger 100 generates an electromotive force, and a current flows. Since the electromotive force generated in the coil 201 (a voltage supplied to the coil 201) is not stable, the rectifying and commutating unit 202 rectifies and smoothes the voltage, and supplies the direct voltage via the power source control unit 203 to the rechargeable battery 204. Accordingly, the rechargeable battery 204 is charged. Here, the rechargeable battery 204 is, for example, a rechargeable battery, such as a lithium-ion battery or a lithium-hydrogen battery.

The power source control unit 203 detects the charged state of the rechargeable battery 204 based on, for example, the voltage or the charging time of the rechargeable battery 204, and controls a power supply to the rechargeable battery 204 and a power supply to the non-contact IC tag 210.

The non-contact IC tag 210 is used for an authentication process on the mobile phone 200 performed between the non-contact IC tag and the charger 100, by performing a predetermined communication with the IC tag authentication unit 120 of the charger 100. The communicating unit 212 performs a communication via the antenna 211 with the charger 100 (the IC tag authentication unit 120). The data-processing unit 213 performs a predetermined process on data that is transmitted and received by the communicating unit 212. The memory 214 is a memory from and to which the data-processing unit 213 reads and writes data. The rectifying circuit 215 rectifies a signal received by the antenna 211. The stabilizing circuit 216 stabilizes output of the rectifying circuit 215. Furthermore, the antenna 211 can transmit not only authentication data but also setting information or the like relating to device settings of a device to be charged.

The control unit 220 performs an overall control of the entire mobile phone 200. The control unit 220 controls, for example, a control of the rechargeable battery 204 by the power source control unit 203, and a communication by the non-contact IC tag 210. Furthermore, the control unit 220, for example, receives input information input to the operating unit 221 (operation on the mobile phone 200), or instructs the notifying unit 222 to give notice of a change in the device settings made through an operation of a user. Furthermore, the control unit 220, for example, gives notice of display contents to the display unit 223 for displaying device settings, input information, or the like, and notifies the vibrating unit 224 of the start or stop of the operation in the case where a silent mode or the like is set. Here, the setting information or the like relating to the device settings of the mobile phone 200 is saved in the EEPROM 225. Accordingly, even in a state where the rechargeable battery 204 is empty, the setting information or the like relating to the device settings of the mobile phone 200 can be saved without being lost.

Next, referring to FIG. 4, a charging process on the mobile phone 200 using the charger 100 will be described. Here, as shown in FIG. 2, it is assumed that the mobile phone 200 is placed on the coil 101 of the charger 100.

In step S402, the IC tag authentication unit 120 performs an authentication process on the mobile phone 200 placed on the coil 101, and determines whether or not the mobile phone 200 is a legitimate device. Here, the IC tag authentication unit 120 notifies the charging control unit 106 of results of the authentication process performed on the mobile phone 200 (i.e., whether the mobile phone 200 is a legitimate device, or an illegitimate device).

Figure 5:
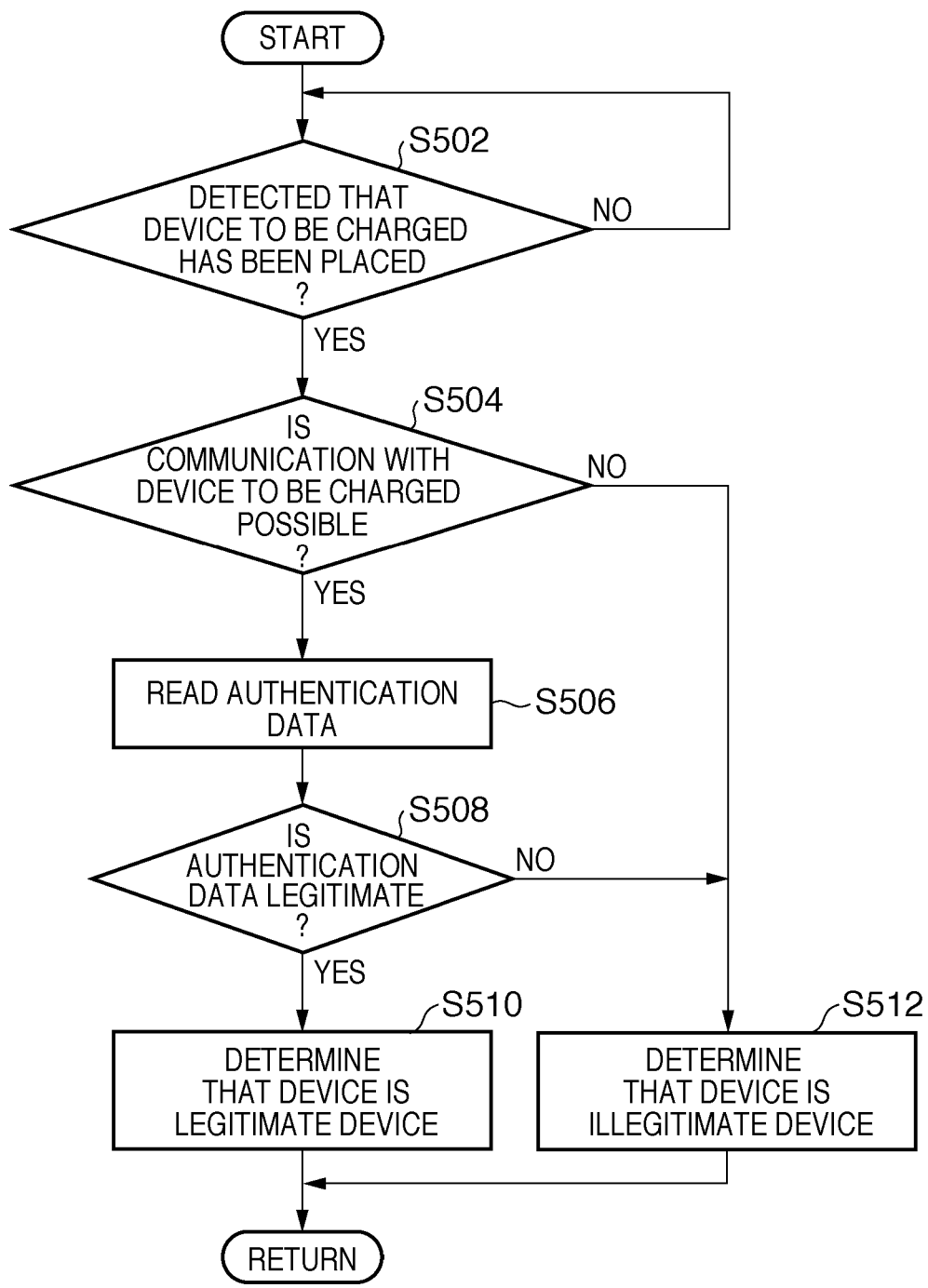
FIG. 5 is a flowchart for illustrating an example of the details of a process that determines whether or not a mobile phone is a legitimate device in step S402 shown in FIG. 4 (authentication process on a mobile phone).

Here, referring to FIG. 5, the details of a process that determines whether or not the mobile phone 200 is a legitimate device in step S402 (authentication process on the mobile phone 200) will be described.

In step S502, the charging control unit 106 confirms via the detecting unit 108 whether or not the sensor unit 109 has detected that a device to be charged has been placed in a charging region. In the case where it is not detected that a device to be charged has been placed in said charging region, such confirmation (step S502) is repeated. In the case where it is detected that a device to be charged has been placed in said charging region, the procedure proceeds to step S504.

In step S504, the IC tag authentication unit 120 determines whether or not communication is possible with the device to be charged detected in step S502. More specifically, under the control of the IC tag control unit 121, the IC tag reader 122 gives, via the antenna 123, the device to be charged a request to transmit authentication data. Then, the IC tag control unit 121 confirms whether or not the authentication data is received from the device to be charged within a given time (i.e., whether or not the authentication data has been transmitted from the device to be charged). In the case where the authentication data is not received, the IC tag authentication unit 120 determines that communication with the device to be charged is not possible, the procedure proceeds to step S512, and it is determined that this device to be charged is an illegitimate device. On the other hand, in the case where the authentication data is received, the IC tag authentication unit 120 determines that a communication with the device to be charged is possible, and the procedure proceeds to step S506.

In step S506, the IC tag reader 122 reads the authentication data received from the device to be charged. Here, the read authentication data is output to the IC tag control unit 121.

In step S508, the IC tag control unit 121 determines whether or not the authentication data read by the IC tag reader 122 is legitimate. In the case where the authentication data is legitimate, the procedure proceeds to step S510, and the IC tag authentication unit 120 determines that the device to be charged is a legitimate device. On the other hand, in the case where the authentication data is not legitimate, the procedure proceeds to step S512, and the IC tag authentication unit 120 determines that the device to be charged is an illegitimate device.

Figure 4:
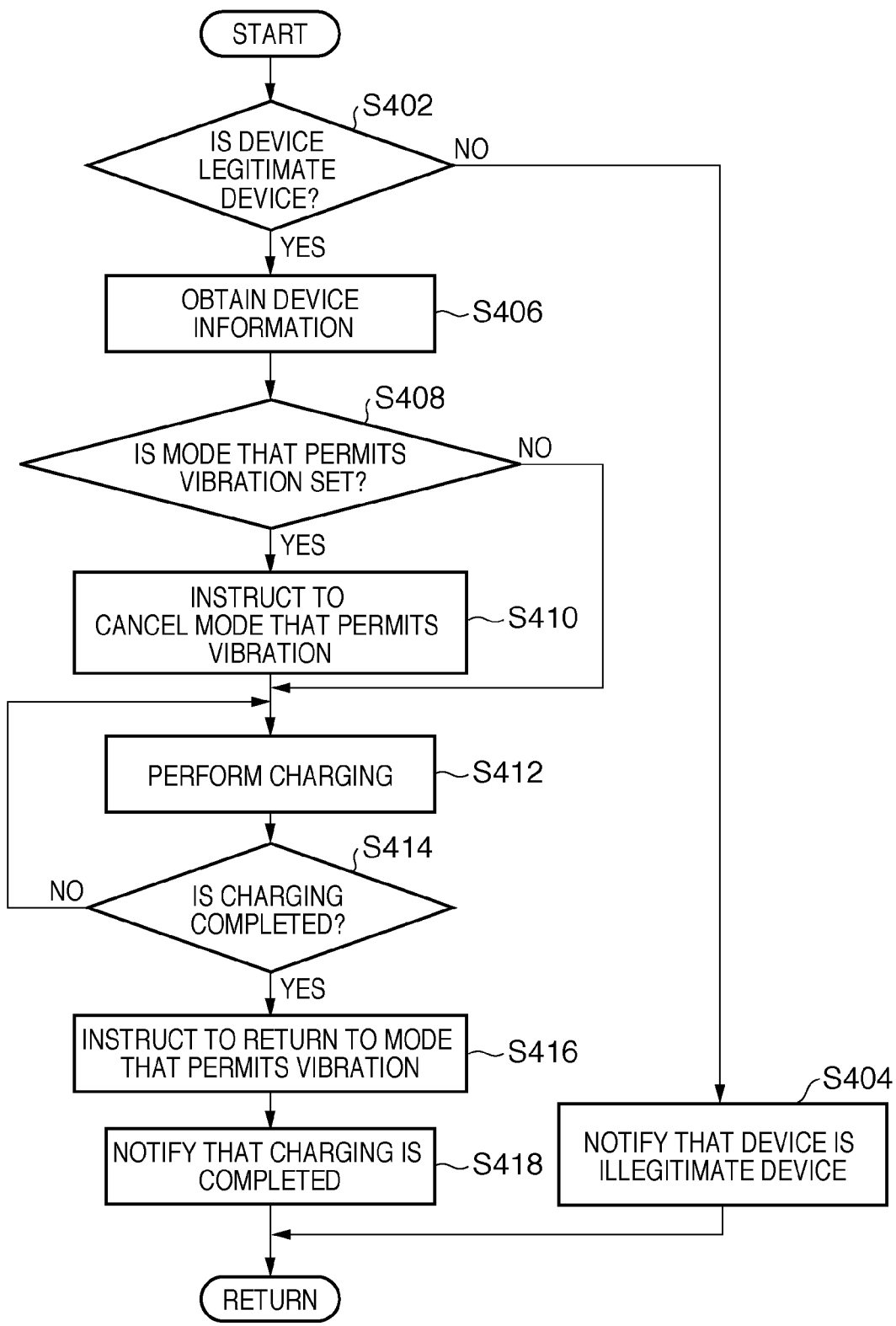
FIG. 4 is a flowchart for illustrating an example of a charging process on one mobile phone using the charger shown in FIG. 1.

In the case where it is determined in step S402 that the mobile phone 200 is an illegitimate device in this manner, as shown in FIG. 4, the procedure proceeds to step S404. On the other hand, in the case where it is determined in step S402 that the mobile phone 200 is a legitimate device, as shown in FIG. 4, the procedure proceeds to step S406.

In step S404, the charging control unit 106 notifies a user that the mobile phone 200 placed on the coil 101 is an illegitimate device (that the mobile phone 200 cannot be authenticated). More specifically, the charging control unit 106 notifies the display control unit 112 that the mobile phone 200 is an illegitimate device, and where the mobile phone 200 has been placed. Then, the display control unit 112 turns on the LED 114 corresponding to the coil 101 at the position where the mobile phone 200 is placed, and displays, on the LCD panel 113, a message to the effect that the mobile phone 200 is an illegitimate device.

In step S406, the charging control unit 106 obtains, via the IC tag authentication unit 120 (the antenna 123), device information relating to device settings of the mobile phone 200. Here, in the mobile phone 200, current device settings are managed by the control unit 220, and can be transmitted as device information via the non-contact IC tag 210 (the antenna 211) in response to a request from the charger 100. Here, the device information relating to device settings of the mobile phone 200 includes information indicating the mode set in the mobile phone 200 (for example, a mode that permits vibration of the mobile phone 200, a mode that inhibits vibration of the mobile phone 200, etc.), information indicating the charged state of the rechargeable battery 204, and the like.

In step S408, the charging control unit 106 determines based on the device information obtained in step S406 whether or not a mode that permits vibration of the mobile phone 200 is set. More specifically, the charging control unit 106 determines whether or not the device information obtained in step S406 contains setting information indicating a mode that permits vibration. In the case where a mode that permits vibration of the mobile phone 200 is set, the procedure proceeds to step S410. On the other hand, in the case where a mode that permits vibration of the mobile phone 200 is not set, the procedure proceeds to step S412.

In step S410, the charging control unit 106 gives, via the IC tag authentication unit 120 (the antenna 123), an instruction to cancel the mode that permits vibration of the mobile phone 200. More specifically, the charging control unit 106 transmits an instruction to change the mode that permits vibration set in the mobile phone 200 to a mode that inhibits vibration, to the mobile phone 200. Accordingly, the mode that permits vibration set in the mobile phone 200 is changed to a mode that inhibits vibration. In the mobile phone 200, the mode is changed to a mode that inhibits vibration, by the control unit 220 notifying the vibrating unit 224 of inhibition of vibration.

In step S412, the charging control unit 106 charges the mobile phone 200 (the rechargeable battery 204) based on the device information obtained in step S406. Since the device information obtained in step S406 contains information indicating the charged state of the rechargeable battery 204, the charging control unit 106 causes a current according to the charging capacity of the rechargeable battery 204 to flow through the coil 101 via the power transmission coil-exciting unit 110, thereby generating a magnetic flux. Accordingly, an electromotive force is generated in the coil 201 of the mobile phone 200, and the rechargeable battery 204 is charged.

In step S414, the charging control unit 106 determines whether or not charging of the mobile phone 200 is completed. In the case where charging of the mobile phone 200 is not completed, the procedure proceeds to step S412, and charging of the mobile phone 200 is continued. On the other hand, in the case where charging of the mobile phone 200 is completed, the procedure proceeds to step S416.

In step S416, the charging control unit 106 gives, via the IC tag authentication unit 120 (the antenna 123), an instruction to return the mode to the mode that permits vibration of the mobile phone 200. In other words, in step S416, the device settings after the change in step S410 is changed to the device settings before the change in step S410. More specifically, the charging control unit 106 transmits an instruction to change the mode that inhibits vibration set in the mobile phone 200 to a mode that permits vibration, to the mobile phone 200. Accordingly, the mode that inhibits vibration set in the mobile phone 200 is changed to a mode that permits vibration. In the mobile phone 200, the mode is changed to a mode that permits vibration, by the control unit 220 notifying the vibrating unit 224 of permission of vibration. Here, in the case where step S410 is not executed (i.e., in the case where it is determined in step S408 that a mode that permits vibration of the mobile phone 200 is not set), the procedure proceeds to step S418 without executing step S416.

In step S418, the charging control unit 106 notifies the user that charging of the mobile phone 200 is completed. More specifically, under the control of the charging control unit 106, the display control unit 112 turns on the LED 114 corresponding to the coil 101 at the position where the mobile phone 200 is placed, and displays, on the LCD panel 113, a message to the effect that charging of the mobile phone 200 is completed.

In the description above, the case is shown in which one device to be charged (the mobile phone 200) is placed on the charger 100. Next, the case in which two devices to be charged are placed on the charger 100 as shown in FIG. 6 will be described. FIG. 6 is a schematic view showing an example of the charger 100 and two devices to be charged (mobile phones 200 and 300). In FIG. 6, a new mobile phone 300 is placed on the charger 100 in addition to the mobile phone 200. Here, the mobile phone 300 has a similar configuration to that of the mobile phone 200. That is to say, the mobile phone 300 is provided with a rechargeable battery, and supports non-contact charging using electromagnetic induction by the charger 100. The charger 100 charges each of the mobile phones 200 and 300 via the coils 101 and 102. Hereinafter, the case will be described in which the charger 100 charges two devices to be charged (the mobile phones 200 and 300), but the number of devices to be charged is not limited to two.

Figure 7A:
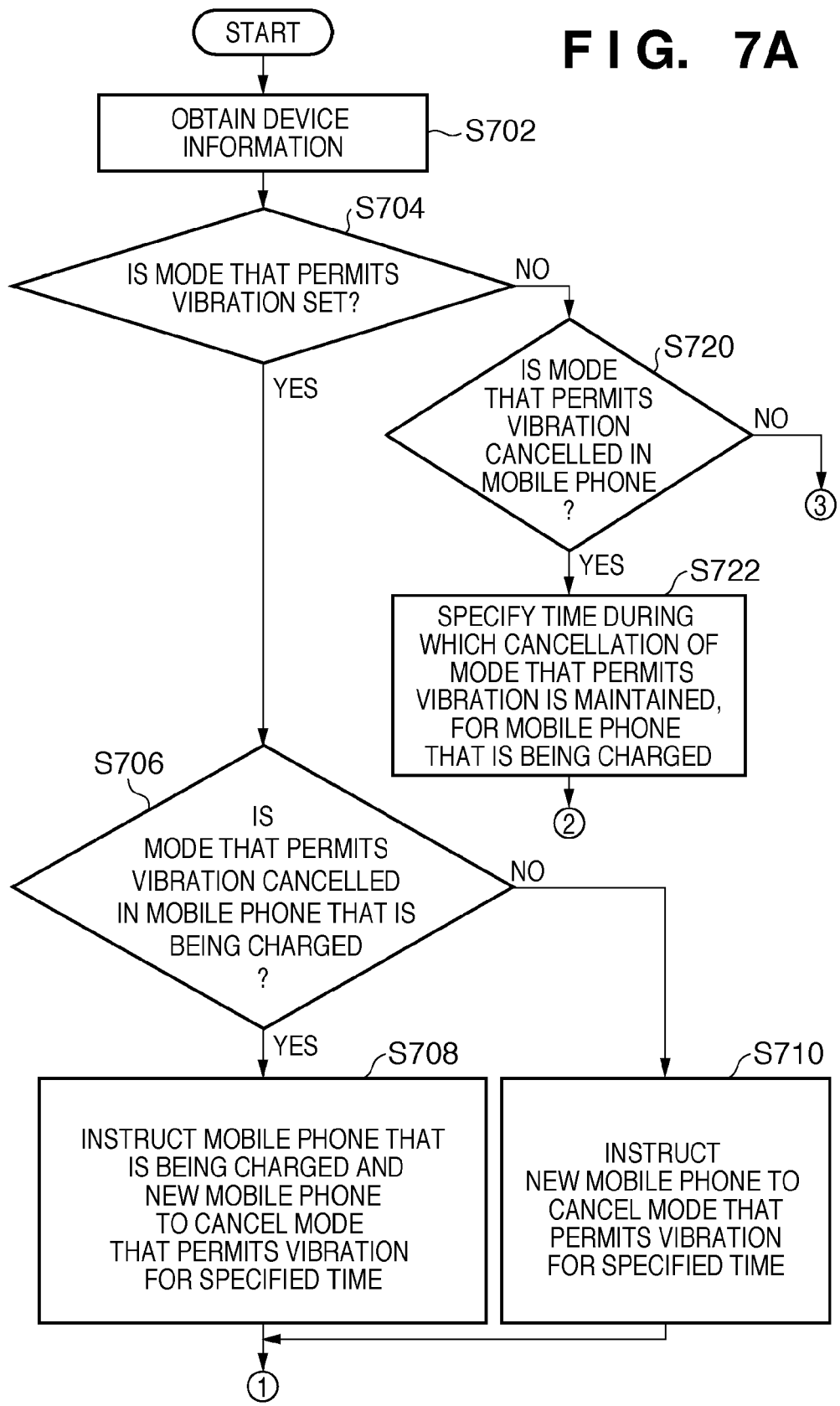
FIGS. 7A and 7B are flowcharts for illustrating an example of a charging process on two mobile phones using the charger shown in FIG. 1.
Figure 7B:
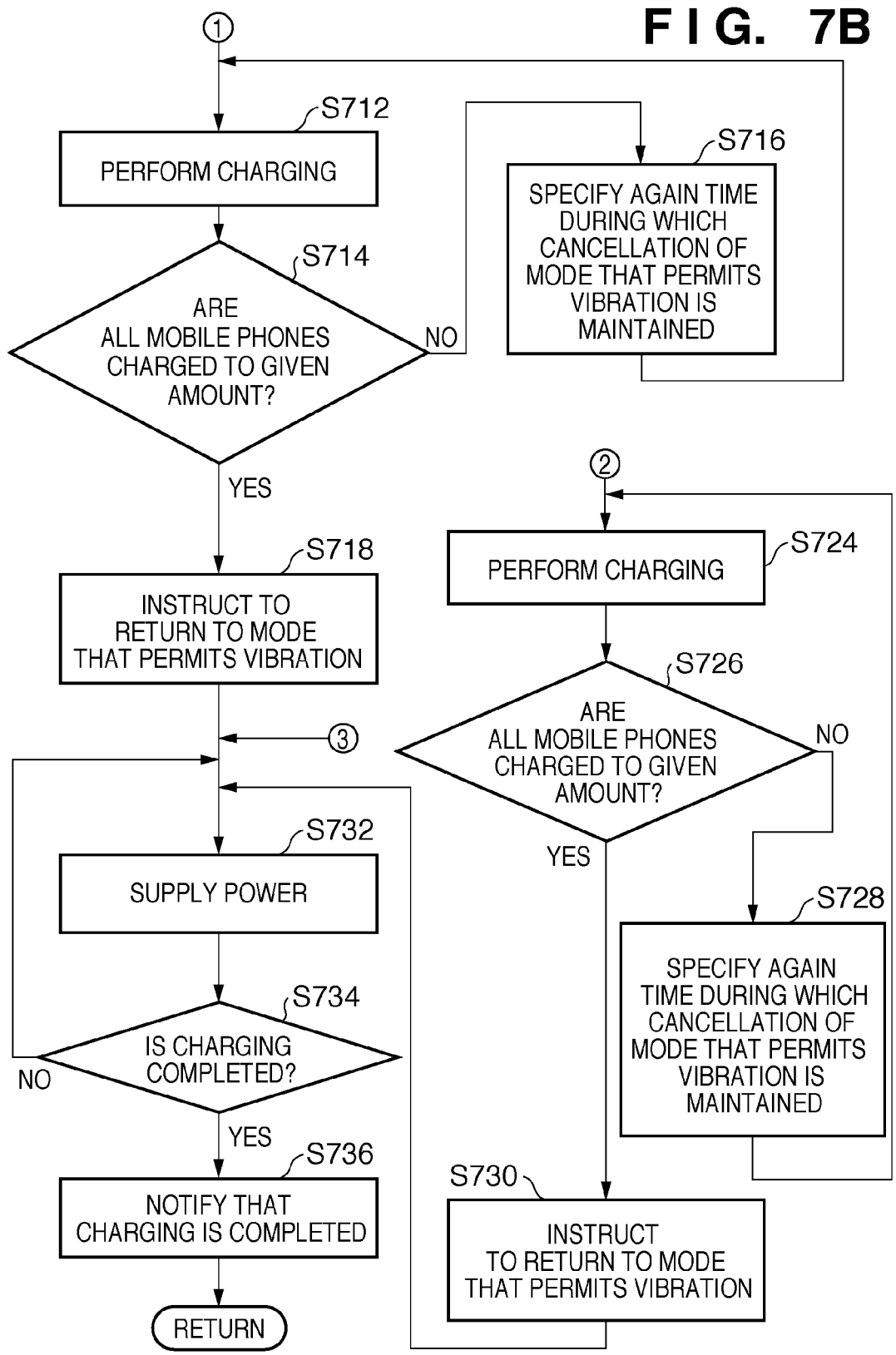

Referring to FIGS. 7A and 7B, a charging process on the mobile phones 200 and 300 using the charger 100 will be described. Here, it is assumed that the mobile phone 200 placed on the coil 101 of the charger 100 is being charged, and that the mobile phone 300 is newly placed on the coil 102 of the charger 100. Furthermore, it is assumed that an authentication process has been performed on the mobile phone 300, and that the mobile phone 300 has been determined as a legitimate device. Here, in the case where the mobile phone 300 is not authenticated, charging of the mobile phone 200 is continued (i.e., only the mobile phone 200 is charged) according to the charging process shown in FIG. 4.

In step S702, the charging control unit 106 obtains, via the IC tag authentication unit 120 (the antenna 123), device information relating to device settings of the mobile phone 300 newly placed on the coil 102. Also in the mobile phone 300, current device settings are managed, and device information relating to device settings of the mobile phone 300 can be transmitted in response to a request from the charger 100, as in the case of the mobile phone 200.

In step S704, the charging control unit 106 determines based on the device information obtained in step S702 whether or not the mode that permits vibration of the mobile phone 300 is set.

In step S704, in the case where the mode that permits vibration of the mobile phone 300 is set, the procedure proceeds to step S706, and the charger 100 manages modes set in both of the mobile phone 200 that is being charged and the mobile phone 300 that is to be charged.

In step S706, the charging control unit 106 determines whether or not the mode that permits vibration is cancelled in the mobile phone 200 that is being charged (i.e., whether or not the mode has been changed to a mode that inhibits vibration of the mobile phone 200 that is being charged). As described above (see FIG. 4), the charger 100 may have given an instruction to cancel the mode that permits vibration, to the mobile phone 200 that is being charged.

In the case where it is determined in step S706 that the mode that permits vibration is cancelled in the mobile phone 200 that is being charged, the procedure proceeds to step S708. In step S708, the charging control unit 106 gives, via the IC tag authentication unit 120 (the antenna 123), an instruction to cancel the mode that permits vibration of the mobile phones 200 and 300. More specifically, the charging control unit 106 transmits an instruction to change the mode that permits vibration set in the mobile phones 200 and 300 to a mode that inhibits vibration, to the mobile phones 200 and 300. At that time, the charging control unit 106 specifies a time during which the change in the device settings of the mobile phones 200 and 300 (the change to a mode that inhibits vibration) is to be maintained. In other words, the charging control unit 106 gives an instruction to return the mode to a mode that permits vibration after a given time has elapsed, to the devices to be charged. This time is calculated based on the charging capacity of the devices to be charged and the amount of power supplied by the charger 100, and determined based on the charging time of the devices to be charged and the charging interval of the charger 100 (the coil 101 or 102). More specifically, the charging control unit 106 specifies a time obtained by adding the longest charging time for the devices to be charged and the charging interval of a coil that charges the device to be charged corresponding to the longest charging time. For example, in the case where the longest charging time is 10 minutes, and the charging interval is 2 seconds, 10 minutes+2 seconds is specified. Accordingly, the mode that permits vibration set in the mobile phone 300 is changed to a mode that inhibits vibration during the time specified by the charging control unit 106. Here, the mode of the mobile phone 200 that is being charged is already changed to a mode that inhibits vibration, and, thus, the setting is made such that the change into the mode that inhibits vibration is maintained during the time specified by the charging control unit 106.

On the other hand, in the case where a mode that permits vibration is not set in the mobile phone 200 that is being charged, it is determined that the mode that permits vibration has not been cancelled, and, thus, the procedure proceeds to step S710. In step S710, the charging control unit 106 gives, via the IC tag authentication unit 120 (the antenna 123), an instruction to cancel the mode that permits vibration of the mobile phone 300. More specifically, the charging control unit 106 transmits an instruction to change the mode that permits vibration set in the mobile phone 300 to a mode that inhibits vibration, to the mobile phone 300. At that time, the charging control unit 106 specifies a time during which the change in the device settings of the mobile phone 300 (the change to a mode that inhibits vibration) is maintained. Accordingly, the mode that permits vibration set in the mobile phone 300 is changed to a mode that inhibits vibration during the time specified by the charging control unit 106.

In step S712, the charging control unit 106 charges the mobile phone 200 and the mobile phone 300. At that time, the mobile phone 200 is being charged, and, thus, charging of the mobile phone 200 is continued.

In step S714, the charging control unit 106 determines whether or not the mobile phone 200 and the mobile phone 300 that are being charged (all devices that are being charged) have been charged by a given amount. The given amount can be freely set, and is set to, for example, 90% of the completely charged state.

In the case where it is determined in step S714 that the mobile phone 200 and the mobile phone 300 that are being charged have not been charged by a given amount, the procedure proceeds to step S716. In step S716, the charging control unit 106 specifies again, for the mobile phones 200 and/or 300, a time during which the cancellation of the mode that permits vibration (the change in the device settings) is maintained, and the procedure proceeds to step S712. At that time, the charging control unit 106 determines a time during which the change in the device settings is maintained, based on the currently charged amount of the mobile phones 200 and/or 300.

In the case where it is determined in step S714 that the mobile phone 200 and the mobile phone 300 that are being charged have been charged by a given amount, the procedure proceeds to step S718. In step S718, the charging control unit 106 gives, via the IC tag authentication unit 120 (the antenna 123), an instruction to return the mode to the mode that permits vibration of the mobile phones 200 and/or 300. In other words, in step S718, the device settings after the change in step S708 or S710 is changed to the device settings before the change in step S708 or S710.

On the other hand, in the case where the mode that permits vibration of the mobile phone 300 is not set, the procedure proceeds to step S720, and the charger 100 manages a mode set in the mobile phone 200 that is being charged.

In step S720, the charging control unit 106 determines whether or not the mode that permits vibration is cancelled in the mobile phone 200 that is being charged (i.e., whether or not the mode has been changed to a mode that inhibits vibration of the mobile phone 200 that is being charged), as in step S706.

In the case where a mode that permits vibration is not set in the mobile phone 200 that is being charged, it is determined that the mode that permits vibration has not been cancelled, and, thus, the procedure proceeds to step S732. On the other hand, in the case where the mode that permits vibration is cancelled in the mobile phone 200 that is being charged, the procedure proceeds to step S722.

In step S722, the charging control unit 106 specifies, for the mobile phone 200 that is being charged, a time during which the cancellation of the mode that permits vibration (the change in the device settings) is maintained.

In step S724, the charging control unit 106 charges the mobile phone 200 and the mobile phone 300, as in step S712. At that time, the mobile phone 200 is being charged, and, thus, charging of the mobile phone 200 is continued.

In step S726, the charging control unit 106 determines whether or not the mobile phone 200 and the mobile phone 300 that are being charged (all devices that are being charged) have been charged by a given amount, as in step S714.

In the case where it is determined in step S726 that the mobile phone 200 and the mobile phone 300 that are being charged have not been charged by the given amount, the procedure proceeds to step S728. In step S728, the charging control unit 106 specifies again, for the mobile phone 200, a time during which the cancellation of the mode that permits vibration (the change in the device settings) is maintained, and the procedure proceeds to step S724. At that time, the charging control unit 106 determines a time during which the change in the device settings is maintained, based on the currently charged amount of the mobile phones 200 and/or 300.

In the case where it is determined in step S726 that the mobile phone 200 and the mobile phone 300 that are being charged have been charged by the given amount, the procedure proceeds to step S730. In step S730, the charging control unit 106 gives, via the IC tag authentication unit 120 (the antenna 123), an instruction to return the mode to the mode that permits vibration of the mobile phone 200.

In step S732, the charging control unit 106 charges the mobile phone 200 and the mobile phone 300. At that time, the mobile phone 200 is being charged, and, thus, charging of the mobile phone 200 is continued. Furthermore, in the case where step S712 is executed, the mobile phone 300 is also being charged, and, thus, charging of the mobile phone 300 is continued.

In step S734, the charging control unit 106 determines whether or not charging of the mobile phones 200 and 300 is completed. In the case where charging of the mobile phones 200 and 300 is not completed, the procedure proceeds to step S732, and charging of the mobile phones 200 and 300 is continued. On the other hand, in the case where charging of the mobile phones 200 and 300 is completed, the procedure proceeds to step S736.

In step S736, the charging control unit 106 notifies the user that charging of the mobile phones 200 and 300 is completed. More specifically, under the control of the charging control unit 106, the display control unit 112 turns on the LED 114 corresponding to the coil 101 at the position where the mobile phone 200 is placed and the LED 115 corresponding to the coil 102 at the position where the mobile phone 300 is placed. Furthermore, the display control unit 112 displays, on the LCD panel 113, a message to the effect that charging of the mobile phones 200 and 300 is completed.

In this manner, in this embodiment, in the case where a plurality of devices to be charged are charged in a non-contact manner, the mode that permits vibration set in the devices to be charged is cancelled (i.e., the device settings are changed) until all devices that are being charged are charged by a given amount. This sort of change in the device settings is made for all devices to be charged in which the mode that permits vibration is set, and, as described above, is made when an increase in the number of devices to be charged is detected (when a new device to be charged is placed on the charger). Accordingly, the position of a device to be charged that is being charged can be prevented from being displaced by vibration of another device to be charged, and the optimal positional relationship between the charger and the devices to be charged can be maintained. Thus, according to this embodiment, even in the case where a plurality of devices to be charged are charged in a non-contact manner, efficient charging can be performed.

Figure 8:
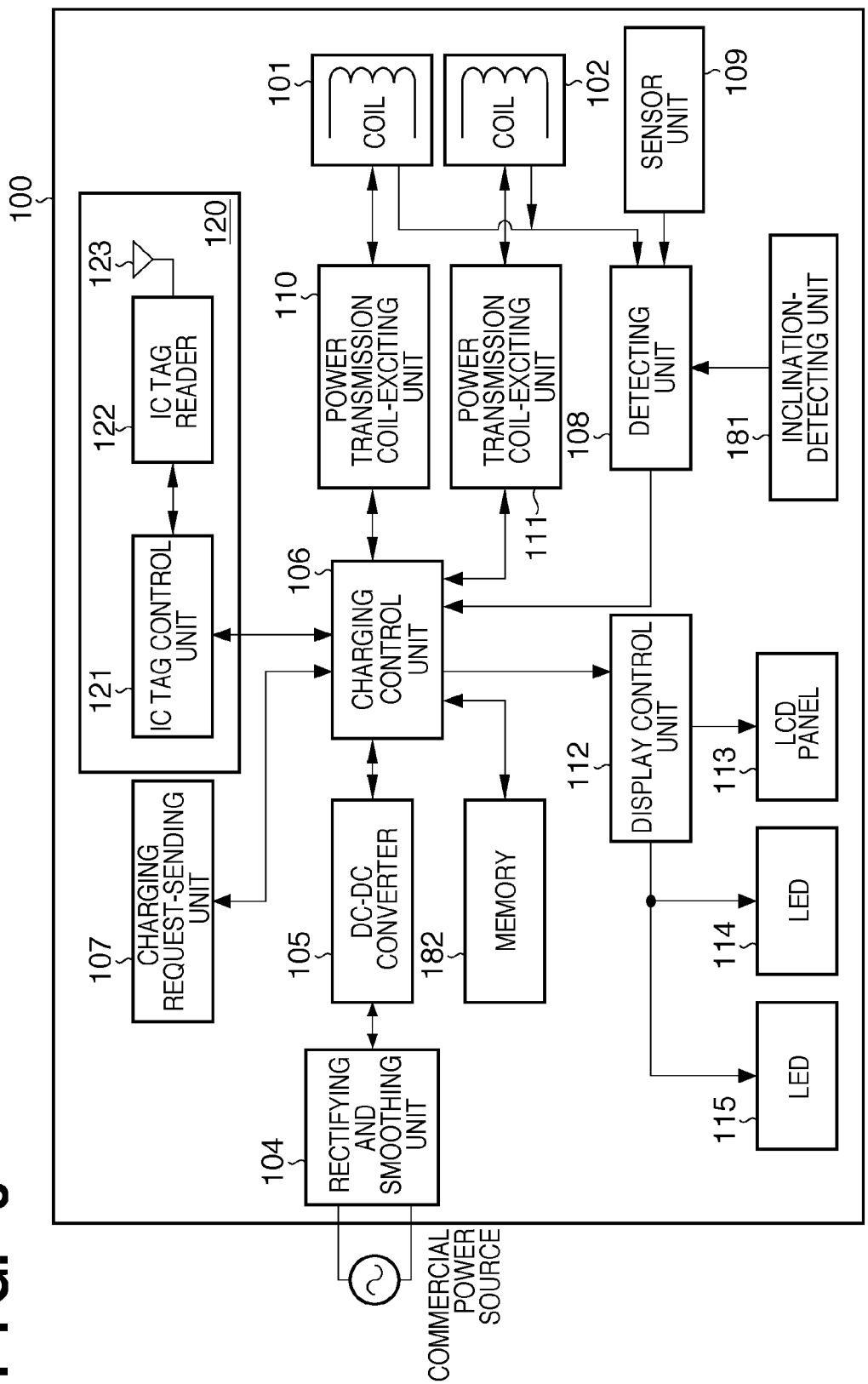
FIG. 8 is a circuit block diagram of a charger as an aspect of the present invention.

Here, the optimal positional relationship between the charger and the devices to be charged may be lost not only when a device to be charged vibrates but also when the charger vibrates and inclined. Thus, as shown in FIG. 8, it is preferable that the charger 100 further has an inclination-detecting unit 181 that detects inclination of the charger 100, and a memory 182 that stores the charged state of a device to be charged that is being charged when inclination of the charger 100 is detected. FIG. 8 is a circuit block diagram of the charger 100 as an aspect of the present invention.

Figure 9A:
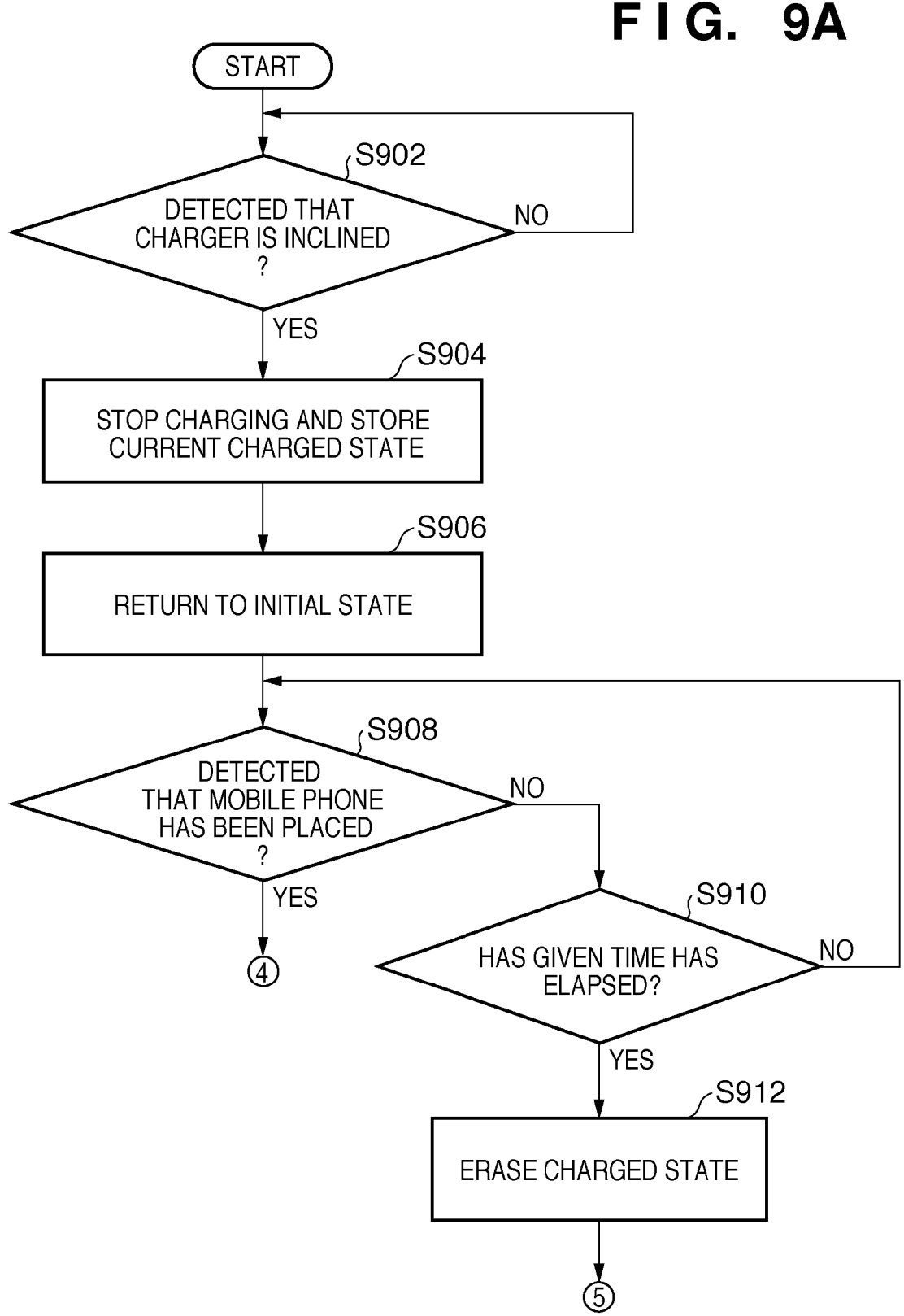

Referring to FIGS. 9A and 9B, a charging process on the mobile phone 200 using the charger 100 shown in FIG. 8 will be described. Here, it is assumed that the mobile phone 200 placed on the coil 101 of the charger 100 is being charged. Hereinafter, only a charging process performed when inclination of the charger 100 is detected will be described, but the charging process shown in FIGS. 9A and 9B and the charging process shown in FIG. 4 may be combined.

In step S902, the charging control unit 106 confirms via the detecting unit 108 whether or not inclination of the charger 100 is detected by the inclination-detecting unit 181. In the case where inclination of the charger 100 is not detected, such confirmation (step S902) is repeated. In the case where inclination of the charger 100 is detected, the procedure proceeds to step S904.

In step S904, the charging control unit 106 stops charging of the mobile phone 200, and stores, in the memory 182, the charged state of the mobile phone 200 when inclination of the charger 100 is detected (i.e., current state). Here, the charged state includes, for example, elapsed time after charging of the device to be charged is started, the charging capacity of the device to be charged, and the like.

In step S906, the charger 100 is returned to the initial state. In the case where the charger 100 is inclined, the position or the angle of the device to be charged may be changed, and, thus, the charger 100 has to be returned to the initial state (e.g., to a state where the charger 100 is not inclined).

In step S908, the charging control unit 106 confirms, via the detecting unit 108, whether or not the sensor unit 109 detects that the mobile phone 200 (device to be charged) has been placed in a charging region.

In the case where it is not detected in step S908 that the mobile phone 200 has been placed, the procedure proceeds to step S910. In step S910, the charging control unit 106 confirms whether or not a given time has elapsed. In the case where a given time has not elapsed, the procedure proceeds to step S908, and confirmation of whether or not it is detected that the mobile phone 200 (device to be charged) has been placed is repeated until the given time has elapsed. In the case where a given time has elapsed, the procedure proceeds to step S912, and the charging control unit 106 erases the charged state of the mobile phone 200 stored in the memory 182 in step S904.

On the other hand, in the case where it is detected in step S908 that the mobile phone 200 has been placed, the procedure proceeds to step S914. In step S914, the IC tag authentication unit 120 determines whether or not a communication with the mobile phone 200 (device to be charged) detected in step S908 is possible. More specifically, under the control of the IC tag control unit 121, the IC tag reader 122 gives, via the antenna 123, the mobile phone 200 a request to transmit authentication data. Then, the IC tag control unit 121 confirms whether or not the authentication data is received from the mobile phone 200 within a given time (i.e., whether or not the authentication data is transmitted from the mobile phone 200). In the case where the authentication data is not received, the IC tag authentication unit 120 determines that a communication with the mobile phone 200 is not possible, the procedure proceeds to step S916, and it is determined that the mobile phone 200 is an illegitimate device. On the other hand, in the case where the authentication data is received, the IC tag authentication unit 120 determines that a communication with the mobile phone 200 is possible, and the procedure proceeds to step S918.

In step S918, the IC tag reader 122 reads the authentication data received from the mobile phone 200. Here, the read authentication data is output to the IC tag control unit 121.

In step S920, the IC tag control unit 121 determines whether or not the authentication data read by the IC tag reader 122 is legitimate. In the case where the authentication data is not legitimate, the procedure proceeds to step S916, and the IC tag authentication unit 120 determines that the mobile phone 200 is an illegitimate device. On the other hand, in the case where the authentication data is legitimate, the procedure proceeds to step S922, and the IC tag authentication unit 120 determines that the mobile phone 200 is a legitimate device.

In step S924, the charging control unit 106 obtains the charged state from the mobile phone 200 (device to be charged) detected in step S908, and determines whether or not this charged state is the same as the charged state stored in the memory 182.

In the case where the charged state obtained from the mobile phone 200 is different from the charged state stored in the memory 182, it is believed that a device to be charged that is charged after inclination of the charger 100 is detected is different from a device to be charged before inclination of the charger 100 is detected. Thus, in step S926, the charging control unit 106 newly charges the mobile phone 200.

On the other hand, in the case where the charged state obtained from the mobile phone 200 is the same as the charged state stored in the memory 182, it is believed that a device that is charged after inclination of the charger 100 is detected is the same as a device before inclination of the charger 100 is detected. Thus, in step S928, the charging control unit 106 continues charging of the mobile phone 200 based on the charged state stored in the memory 182.

In step S930, the charging control unit 106 notifies the user of the state of the charger 100. For example, in the case where step S926 or S928 is executed, under the control of the charging control unit 106, the display control unit 112 displays, on the LCD panel 113, a message to the effect that charging of the mobile phone 200 is completed. Furthermore, in the case where step S916 is executed, under the control of the charging control unit 106, the display control unit 112 displays, on the LCD panel 113, a message to the effect that the mobile phone 200 is an illegitimate device.

In this manner, in this embodiment, in the case where it is detected that the charger is inclined, charging of the device to be charged is stopped, and the charged state of the device to be charged when inclination of the charger is detected is stored. Then, in the case where a device to be charged that is charged after inclination of the charger is detected is the same as the device to be charged before inclination of the charger is detected, charging of the device to be charged is continued based on the stored charged state. Furthermore, in the case where a device to be charged that is charged after inclination of the charger is detected is different from the device to be charged before inclination of the charger is detected, charging of the device to be charged is newly performed. Here, in the case where inclination of the charger is detected, the charger is returned to the initial state, and, thus, the optimal positional relationship between the charger and the devices to be charged can be maintained, and efficient charging can be performed.

Here, in this embodiment, an example is described in which a device to be charged is a mobile phone, but the device to be charged may be any device that can be charged in a non-contact manner. Furthermore, in this embodiment, IC tag authentication is used as authentication of a device to be charged, but authentication data may be made redundant on a coil that generates a magnetic flux, or a wireless device such as a wireless LAN or a Bluetooth may be used.

Here, the description of the foregoing embodiments is merely an example, and there is no limitation to this. Changes are possible as appropriate in the configuration and the operation of the foregoing embodiments.

It is to be understood that the present invention may also be accomplished by supplying a system or an apparatus with a storage medium in which a program code of software, which realizes the functions of each of the above described embodiments, is stored, and causing a computer (or CPU or MPU) of the system or apparatus to read out and execute the program code stored in the storage medium.

In this case, the program code itself read from the storage medium realizes the functions of each of the above described embodiments, and therefore the program code and the storage medium in which the program code is stored constitute the present invention.

Examples of the storage medium for supplying the program code include a floppy (registered trademark) disk, a hard disk, a magnetic-optical disk, optical disks, such as a CD-ROM, a CD-R, a CD-RW, a DVD-ROM, a DVD-RAM, a DVD-RW, and a DVD+RW, a magnetic tape, a nonvolatile memory card, and a ROM. Alternatively, the program may be downloaded via a network.

Further, it is to be understood that the functions of each of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of each of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2009-118036, filed May 14, 2009, which is hereby incorporated by reference herein in its entirety.

The invention claimed is:

1. A charging apparatus comprising:
a power transmitting unit that wirelessly transmits power used to charge a battery to an external apparatus; and
a controller that determines whether or not the charging apparatus is inclined, and determines whether or not to stop charging the battery based on a determination of whether or not the charging apparatus is inclined.

2. The charging apparatus according to claim 1, wherein the controller determines whether or not the external apparatus is in a mode that permits vibration, and changes a mode of the external apparatus to a mode that inhibits vibration, before charging of the battery is started in a case where the external apparatus is in a mode that permits vibration.

3. The charging apparatus according to claim 1, wherein the controller changes a mode of the external apparatus to a mode that permits vibration, after charging of the battery ends in a case where the external apparatus is in a mode that inhibits vibration.

4. The charging apparatus according to claim 1, wherein the controller determines whether or not the external apparatus is authenticated by an authentication process, and determines whether or not to start to charge the battery based on a determination of whether or not the external apparatus is authenticated by the authentication process.

5. A method comprising:
causing a power transmitting unit to wirelessly transmit power used to charge a battery to an external apparatus;
determining whether or not a charging apparatus including the power transmitting unit is inclined; and
determining whether or not to stop charging the battery based on a determination of whether or not the charging apparatus is inclined.

6. The method according to claim 5, further comprising:
determining whether or not the external apparatus is in a mode that permits vibration; and
changing a mode of the external apparatus to a mode that inhibits vibration, before charging of the battery is started in a case where the external apparatus is in a mode that permits vibration.

7. A non-transitory storage medium that stores a program for causing a computer to execute a method, the method comprising:
causing a power transmitting unit to wirelessly transmit power used to charge a battery to an external apparatus;
determining whether or not a charging apparatus including the power transmitting unit is inclined; and
determining whether or not to stop charging the battery based on a determination of whether or not the charging apparatus is inclined.

8. The charging apparatus according to claim 1, wherein the external apparatus is an apparatus capable of acting as a mobile phone.

9. The method according to claim 5, further comprising changing a mode of the external apparatus to a mode that permits vibration, after charging of the battery ends in a case where the external apparatus is in a mode that inhibits vibration.

10. The method according to claim 5, further comprising:
determining whether or not the external apparatus is authenticated by an authentication process; and
determining whether or not to start to charge the battery based on a determination of whether or not the external apparatus is authenticated by the authentication process.

11. The method according to claim 5, wherein the external apparatus is an apparatus capable of acting as a mobile phone.

12. A charging apparatus comprising:
a power transmitting unit that wirelessly transmits power used to charge a battery to an external apparatus; and
a controller that determines whether or not the charging apparatus is inclined, and determines whether or not to control the charging of the battery based on a determination of whether or not the charging apparatus is inclined.

13. The charging apparatus according to claim 12, wherein the controller determines whether or not the external apparatus is in a mode that permits vibration, and changes a mode of the external apparatus to a mode that inhibits vibration, before charging of the battery is started in a case where the external apparatus is in a mode that permits vibration.

14. The charging apparatus according to claim 12, wherein the controller changes a mode of the external apparatus to a mode that permits vibration, after charging of the battery ends in a case where the external apparatus is in a mode that inhibits vibration.

15. The charging apparatus according to claim 12, wherein the controller determines whether or not the external apparatus is authenticated by an authentication process, and determines whether or not to start to charge the battery based on a determination of whether or not the external apparatus is authenticated by the authentication process.

16. The charging apparatus according to claim 12, wherein the external apparatus is an apparatus capable of acting as a mobile phone.

17. A method comprising:
causing a power transmitting unit to wirelessly transmit power used to charge a battery to an external apparatus;
determining whether or not a charging apparatus including the power transmitting unit is inclined; and
determining whether or not to control the charging of the battery based on a determination of whether or not the charging apparatus is inclined.

18. The method according to claim 17, further comprising:
determining whether or not the external apparatus is in a mode that permits vibration; and
changing a mode of the external apparatus to a mode that inhibits vibration, before charging of the battery is started in a case where the external apparatus is in a mode that permits vibration.

19. The method according to claim 17, further comprising changing a mode of the external apparatus to a mode that permits vibration, after charging of the battery ends in a case where the external apparatus is in a mode that inhibits vibration.

20. The method according to claim 17, further comprising:
determining whether or not the external apparatus is authenticated by an authentication process; and
determining whether or not to start to charge the battery based on a determination of whether or not the external apparatus is authenticated by the authentication process.

21. The method according to claim 17, wherein the external apparatus is an apparatus capable of acting as a mobile phone.

22. A non-transitory storage medium that stores a program for causing a computer to execute a method, the method comprising:
causing a power transmitting unit to wirelessly transmit power used to charge a battery to an external apparatus;
determining whether or not a charging apparatus including the power transmitting unit is inclined; and
determining whether or not to control the charging of the battery based on a determination of whether or not the charging apparatus is inclined.

23. A power transmitting apparatus comprising:
a power transmitting unit that wirelessly transmits power used to charge a battery to an external apparatus; and
a controller that determines whether or not the power transmitting apparatus is inclined, and determines whether or not to stop transmitting power used to charge the battery to the external apparatus based on a determination of whether or not the power transmitting apparatus is inclined.

24. The power transmitting apparatus according to claim 23, wherein the controller determines whether or not the external apparatus is in a mode that permits vibration, and changes a mode of the external apparatus to a mode that inhibits vibration, before charging of the battery is started in a case where the external apparatus is in a mode that permits vibration.

25. The power transmitting apparatus according to claim 23, wherein the controller changes a mode of the external apparatus to a mode that permits vibration, after charging of the battery ends in a case where the external apparatus is in a mode that inhibits vibration.

26. The power transmitting apparatus according to claim 23, wherein the controller determines whether or not the external apparatus is authenticated by an authentication process, and determines whether or not to start to charge the battery based on a determination of whether or not the external apparatus is authenticated by the authentication process.

27. The power transmitting apparatus according to claim 23, wherein the external apparatus is an apparatus capable of acting as a mobile phone.

28. A method comprising:
causing a power transmitting unit to wirelessly transmit power used to charge a battery to an external apparatus;
determining whether or not a power transmitting apparatus including the power transmitting unit is inclined; and
determining whether or not to stop transmitting power used to charge the battery to the external apparatus based on a determination of whether or not the power transmitting apparatus is inclined.

29. The method according to claim 28, further comprising:
determining whether or not the external apparatus is in a mode that permits vibration; and
changing a mode of the external apparatus to a mode that inhibits vibration, before charging of the battery is started in a case where the external apparatus is in a mode that permits vibration.

30. The method according to claim 28, further comprising changing a mode of the external apparatus to a mode that permits vibration, after charging of the battery ends in a case where the external apparatus is in a mode that inhibits vibration.

31. The method according to claim 28, further comprising:
determining whether or not the external apparatus is authenticated by an authentication process; and determining whether or not to start to charge the battery based on a determination of whether or not the external apparatus is authenticated by the authentication process.

32. The method according to claim 28, wherein the external apparatus is an apparatus capable of acting as a mobile phone.

33. A non-transitory storage medium that stores a program for causing a computer to execute a method, the method comprising:
    causing a power transmitting unit to wirelessly transmit power used to charge a battery to an external apparatus;
    determining whether or not a power transmitting apparatus including the power transmitting unit is inclined; and
    determining whether or not to stop transmitting power used to charge the battery to the external apparatus based on a determination of whether or not the power transmitting apparatus is inclined.

34. A power transmitting apparatus comprising:
    a power transmitting unit that wirelessly transmits power used to charge a battery to an external apparatus; and
    a controller that determines whether or not the power transmitting apparatus is inclined, and determines whether or not to control the transmission of power used to charge the battery based on a determination of whether or not the power transmitting apparatus is inclined.

35. The power transmitting apparatus according to claim 34, wherein the controller determines whether or not the external apparatus is in a mode that permits vibration, and changes a mode of the external apparatus to a mode that inhibits vibration, before charging of the battery is started in a case where the external apparatus is in a mode that permits vibration.

36. The power transmitting apparatus according to claim 34, wherein the controller changes a mode of the external apparatus to a mode that permits vibration, after charging of the battery ends in a case where the external apparatus is in a mode that inhibits vibration.

37. The power transmitting apparatus according to claim 34, wherein the controller determines whether or not the external apparatus is authenticated by an authentication process, and determines whether or not to start to charge the battery based on a determination of whether or not the external apparatus is authenticated by the authentication process.

38. The power transmitting apparatus according to claim 34, wherein the external apparatus is an apparatus capable of acting as a mobile phone.

39. A method comprising:
    causing a power transmitting unit to wirelessly transmit power used to charge a battery to an external apparatus;
    determining whether or not a power transmitting apparatus including the power transmitting unit is inclined; and
    determining whether or not to control the transmission of power used to charge the battery based on a determination of whether or not the power transmitting apparatus is inclined.

40. The method according to claim 39, further comprising:
    determining whether or not the external apparatus is in a mode that permits vibration; and
    changing a mode of the external apparatus to a mode that inhibits vibration, before charging of the battery is started in a case where the external apparatus is in a mode that permits vibration.

41. The method according to claim 39, further comprising changing a mode of the external apparatus to a mode that permits vibration, after charging of the battery ends in a case where the external apparatus is in a mode that inhibits vibration.

42. The method according to claim 39, further comprising:
    determining whether or not the external apparatus is authenticated by an authentication process; and
    determining whether or not to start to charge the battery based on a determination of whether or not the external apparatus is authenticated by the authentication process.

43. The method according to claim 39, wherein the external apparatus is an apparatus capable of acting as a mobile phone.

44. A non-transitory storage medium that stores a program for causing a computer to execute a method, the method comprising:
    causing a power transmitting unit to wirelessly transmit power used to charge a battery to an external apparatus;
    determining whether or not a power transmitting apparatus including the power transmitting unit is inclined; and
    determining whether or not to control the transmission of power used to charge the battery based on a determination of whether or not the power transmitting apparatus is inclined.

* * * * *